UNITED STATES PATENT OFFICE.

JONATHAN W. HARRIS, OF MONTCLAIR, NEW JERSEY, ASSIGNOR, BY MESNE ASSIGNMENTS, TO WESTERN ELECTRIC COMPANY, INCORPORATED, A CORPORATION OF NEW YORK.

INSULATING COMPOUND AND THE METHOD OF FORMING THE SAME.

1,240,567.  Specification of Letters Patent.  Patented Sept. 18, 1917.

No Drawing.  Application filed March 5, 1915.  Serial No. 12,394.

*To all whom it may concern:*

Be it known that I, JONATHAN W. HARRIS, a citizen of the United States, residing at Montclair, in the county of Essex and State of New Jersey, have invented certain new and useful Improvements in Insulating Compounds and the Methods of Forming the Same, of which the following is a full, clear, concise, and exact description.

This invention relates to an insulating compound and the method of forming the same. Its object is to provide for wires or other electric conductors, an elastic coating possessing high insulating properties and which offers high resistance to solvents, acids, alkalis and heat.

The invention utilizes the desirable property of certain oils, particularly castor oil, of solidifying into an insoluble mass when subjected to destructive distillation, as set forth in United States Letters Patent No. 1,101,281 dated June 23, 1914.

In accordance with the present invention, one or more of the so-called metallic resinates, such as lime resinate, copper resinate, etc., or such resinate together with other suitable substances, are brought into combination with a suitable oil, such as castor oil, thereby producing a compound which, when subjected to destructive distillation, that is to temperature such as will result in the polymerization of the oil, will provide an insulating material having the aforementioned desirable properties.

In the preferred manner of practising the invention castor oil and one or more of the metallic resinates are brought into combination by heating the mixture of oil and resinate or resinates. The temperature during this preliminary step of the process is preferably between 250° and 310° C. As is well known, castor oil when subjected to destructive distillation solidifies into an insoluble mass. The aforementioned heating is preferably continued to almost the critical point at which such solidification of the castor oil takes place. In practice, it has been been found desirable that the heating of the mixture may be continued until the water, œnanthaldehyde and other decomposition products of castor oil have been distilled to the extent of approximately 5% to 15% of the original volume of castor oil.

A fusion mixture is thus produced which, while hot is readily soluble in such suitable solvents as turpentine, pine oil, solvent naphtha and kerosene, or mixtures of the same. The fusion mixture can quickly and readily be converted, at a suitable temperature, into the insoluble solid condition aforementioned.

The above mentioned fusion mixture may be applied in the melted condition to the wire or other object to be coated; or the fusion mixture may be dissolved in a suitable solvent, such as one or more of the solvents above mentioned, and the solution applied to the wire or other object to be coated.

The coated wire or other object is then subjected for a sufficient length of time to a temperature suitable for completing the destructive distillation and polymerization of the castor oil, that is to a temperature approximately 250° to 310° C. The temperature is preferably about 300° C., or thereabout in order to expedite the process. At such temperature the complete destructive distillation and polymerization of the coating upon the wire into a solid mass takes place in from about one-half to three minutes, depending on the size of the wire. A machine especially suitable for applying and making insulating coating upon wire is disclosed in United States Letters Patent No. 1,004,251, dated September 26, 1911.

The finished coating is a hard, elastic, continuous, enamel-like substance remarkably resistant to heat, organic solvents, dilute acids and alkalis.

It has been found that metallic soaps of castor oil, or metallic oxids suitable, when heated with the oil, for forming metallic soaps (for example, copper oxid, ferric oxid, aluminum oxid and the various oxids of the alkaline earths), or the so-called fossil resins, or combinations of the aforementioned agents may be substituted, in whole or in part, for the metallic resinates in the process and product above described. Processes and products based on these other agents, form the subject-matter of other copending applications.

The proportion of castor oil and metallic resinate or other of the aforementioned agents may be varied at will, according to the hardness desired in the finished coating.

The greater the porportion of metallic resinate or other hardening agent or agents, the harder will be the finished coating and the lower its elasticity.

What is claimed is:

1. An insulating coating comprising a metallic resinate and castor oil subjected to destructive distillation.

2. An insulating material comprising a polymerized compound of castor oil and a metallic resinate.

3. The process of making an insulating coating mixture which consists in heating together a metallic resinate and castor oil at a temperature approximately 250° to 310° C.

4. The process of making an insulating coating which consists in mixing, by the aid of heat, a metallic resinate and castor oil, thus forming a coating mixture, and subjecting the coating mixture thus formed, after application to the article to be coated, to a temperature sufficient to destructively distil the castor oil and form a hard, elastic, enamel-like substance.

5. The process of making insulating material which consists in heating a mixture of a metallic resinate and castor oil, and subjecting said mixture, in the form in which the insulating material is desired, to sufficient heat to convert the mixture into a solid insoluble substance.

6. The process of making an insulating material which consists in polymerizing a mixture of castor oil and metallic resinate.

7. The process of making an insulating coating which consists in heating a mixture of a metallic resinate and castor oil to an extent approximating but short of that necessary for converting the mixture into a solid mass, and then subjecting the mixture applied to an object to be coated, to a temperature suitable for converting the coating into a hard, enamel-like substance.

8. The process of making an insulating coating which consists in heating a mixture of a metallic resinate and castor oil at a temperature approximating 250° to 310° C. until approximately from 5% to 15% of the decomposition products of the castor oil has been distilled, and then subjecting the mixture applied to the object to be coated, to a temperature of approximately 300° C.

In witness whereof, I hereunto subscribe my name this 3rd day of March A. D. 1915.

JONATHAN W. HARRIS.

Witnesses:
E. Edla,
K. L. Stahl.